United States Patent

[11] 3,625,770

| [72] | Inventors | Frank C. Arrance<br>Costa Mesa;<br>Albert G. Rosa, Placentia, both of Calif. |
|---|---|---|
| [21] | Appl. No. | 829,573 |
| [22] | Filed | June 2, 1969 |
| [45] | Patented | Dec. 7, 1971 |
| [73] | Assignee | McDonnell Douglas Corporation<br>Santa Monica, Calif. |

[54] FLEXIBLE MATRIX AND BATTERY SEPARATOR EMBODYING SAME
12 Claims, 9 Drawing Figs.

[52] U.S. Cl. .................................................. 136/145,
136/146, 117/126 R
[51] Int. Cl. .................................................. H01m 3/02
[50] Field of Search ........................................... 136/6, 86,
145, 146; 260/47 ET; 117/126 R

[56] References Cited
UNITED STATES PATENTS

| 3,265,536 | 8/1966 | Miller et al. ................... | 136/146 |
| 3,364,077 | 1/1968 | Arrance et al. ............... | 136/146 |
| 3,375,224 | 3/1968 | Cordier et al. ................ | 117/126 R |
| 3,476,637 | 11/1969 | Nasca et al. ................... | 260/47 ET |
| 3,542,596 | 11/1970 | Arrance ........................ | 136/6 |

*Primary Examiner*—Donald L. Walton
*Attorney*—Max Geldin

ABSTRACT: Production of flexible matrix having high resistance to alkali attack at elevated temperature over an extended period, by contacting a chrysotile asbestos (pure fuel cell grade) mat with polyphenylene oxide, to substantially uniformly impregnate the mat with such polyphenylene oxide. The resulting polyphenylene oxide impregnated mat, e.g. in box or envelope form, can be coated with a flexible substantially inorganic film by dip-coating in a mixture preferably of a major portion of an inorganic or cermic separator material, a minor portion of potassium titanate in short fiber form, and a minor portion of an organic polymer, e.g. polyphenylene oxide, dissolved in a suitable solvent such as chloroform. The resulting porous chrysotile asbestos separator uniformly impregnated with polyphenylene oxide and having a flexible coating thereon as described above, has low electrical resistivity, is smooth and uniform in thickness, is highly flexible, and has markedly improved resistance to alkali at elevated temperatures over an extended period. When formed into a box, bag or envelope, an electrode such as a zinc electrode, can be inserted into the box or bag-shaped flexible porous battery separator above, and incorporated in a battery in side-by-side relation with other electrodes, such as silver electrodes.

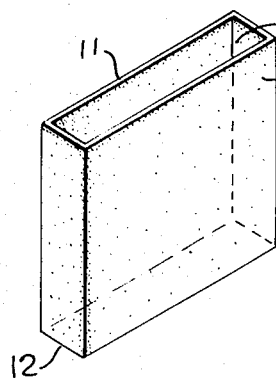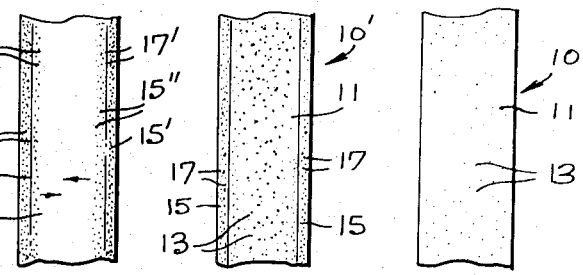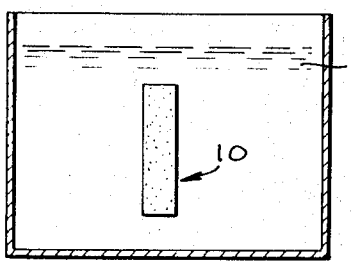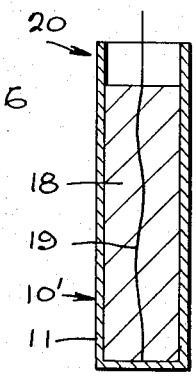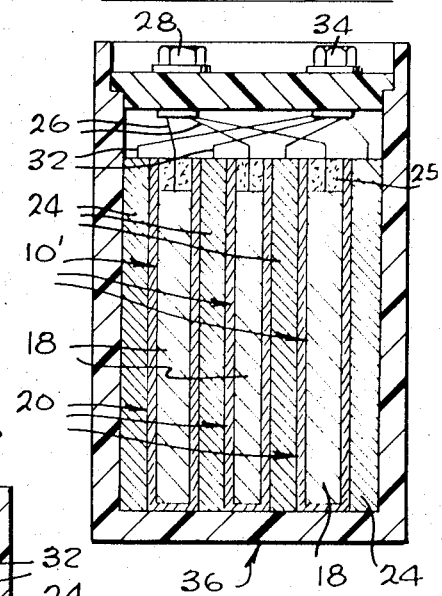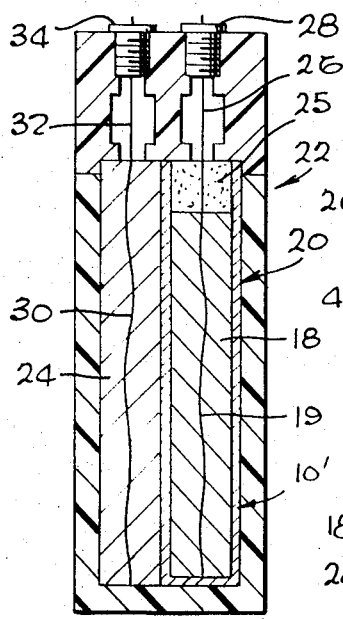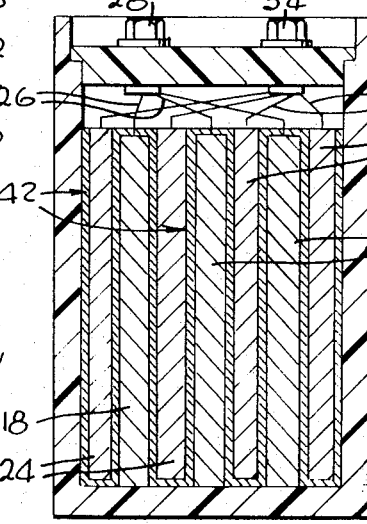
FRANK C. ARRANCE
ALBERT G. ROSA
INVENTORS
BY Max Geldin
ATTORNEY

FLEXIBLE MATRIX AND BATTERY SEPARATOR EMBODYING SAME

This invention relates to production of flexible porous matrix which is highly resistant to alkali at elevated temperatures, and which can be employed in producing an improved porous battery separator having the foregoing properties, and is particularly concerned with treatment of a pure fuel cell grade (chrysotile) asbestos mat, e.g. in the shape of an envelope, to substantially improve its resistance to alkali at high temperatures, and the additional treatment of such alkali and temperature resistant matrix to provide an improved porous flexible battery separator formed of chrysotile asbestos, and which has low electrical resistivity and the aforementioned alkali and high temperature resistance properties, so that when incorporated in a battery, such as a high energy density silver-zinc battery, such battery can be heated or sterilized over an extended period of time, without damaging the separator and affording a separator having extended life over a period of charge-discharge cycles of such secondary battery.

The invention is also concerned with procedure for producing such flexible matrix, and with procedure for forming a flexible porous battery separator embodying such flexible matrix.

Batteries are an important source of energy storage for power generation. In addition to the common lead-acid storage battery, an important type e.g., battery is the high energy density alkaline electrolyte battery such as the silver-zinc, silver-cadmium nickel-cadmium, nickel-zinc and metal-air, e.g. zinc-oxygen battery. High energy density batteries are generally battery systems which have a substantially higher energy per unit of weight than conventional, etc., lead-acid, storage batteries. Such high energy density batteries have many applications such as in portable tools and appliances, television, radio and record players, engine starting, portable X-ray units, and the like. In such batteries, it is conventional to employ a separator in the form of a porous member between the electrodes.

In high energy density batteries such as those noted above, the separator performs the function of retaining electrolyte e.g., potassium hydroxide, separating the electrodes, and permitting transfer of electrolyte ions but preventing migration of electrode ions or growth of dendritic crystals of electrode ions which short circuit the battery.

Improved rigid inorganic separators in the form of certain aluminosilicates which are particularly suited for use in high energy density batteries are described, for example, in U.S. Pat. No. 3,379,570. Such inorganic separators, preferably in the form of sintered ceramic separators, when assembled in a battery of this type, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperature, e.g., of the order of 100° C. and above.

However, these rigid sintered separators present certain manufacturing, design and assembly problems. Thus, the production of the above-noted rigid inorganic separators, which are in the form of very thin membranes, requires a certain care in handling, packing and assembling in a battery to prevent cracking and breaking thereof. It has, therefore, assumed considerable importance to provide an inorganic separator which is readily produced and having the advantageous properties of the inorganic separators noted above, that is, having low resistivity, resistance to corrosive chemicals and operability at elevated temperatures, e.g., about 100° C., but which, in addition, is flexible and thus avoids the disadvantages of the rigid inorganic separators.

Further, the above inorganic separators or membranes are substantially rigid, and when employed in a battery between adjacent electrodes, e.g., zinc and silver electrodes, during operation of the battery, the electrodes, particularly the zinc electrode, tends to change shape and to move out of complete contact with the separator, thus reducing the electrical efficiency of the battery. Also, when employing the above-noted substantially rigid inorganic separators, it is necessary, when assembling such separators in a battery, together with the necessary electrodes or electrode plates, to mount the individual separators in properly spaced relation to provide electrode compartments between adjacent separators, and to then insert the electrodes in the electrode compartments between an adjacent pair of separators. This not only requires proper spacing of the separators so as to receive the electrodes therebetween in relatively snug fitting relation, but also requires that the electrode compartments on opposite sides of a separator be properly insulated to prevent short circuiting of electrolyte from one electrode compartment around a separator and into the adjacent electrode compartment. Accordingly, a further particular area of interest has been the need for provision of flexible separators, preferably in the form of a bag or envelope which can serve as the electrode compartment and into which the battery electrode can be inserted.

In the copending application of Frank C. Arrance, Albert G. Rosa and Ronald J. Hass, Ser. No. 707,808, filed Feb. 23, 1968, there is described an improved flexible porous separator, which can be box shaped to provide a compartment for a battery electrode, produced by applying on a flexible porous substrate, such as flexible sheets or mats of various materials including potassium titanate paper, asbestos, aluminosilicate sheets, and the like, a film comprising a mixture of an inorganic separator material such as zirconia, and a organic polymeric bonding agent of various types, such as polyphenylene oxide, or a fluorocarbon polymer such as vinylidene fluoride polymer, bonding the particles of the inorganic material together with the bonding agent, and forming a porous substantially inorganic separator film on the flexible substrate. Although various types of flexible matrix materials are described for use in producing the flexible separator formed of the flexible porous matrix having the above-described inorganic flexible film applied thereto, it has been found from testing and experience that the best matrix materials for this purpose are inorganic materials such as fibrous asbestos and potassium titanate, particularly the former.

However, the relatively concentrated alkali, e.g. potassium hydroxide, electrolyte solutions usually employed in batteries employing as separator the above-noted flexible film applied to porous matrix materials, e.g. asbestos, reacts with these materials, such as asbestos, in varying degrees and particularly at elevated temperatures, resulting in gradual dissolution and destruction of the matrix and causing reduced useful battery operating life. In addition, in certain battery applications heat sterilization of the battery at elevated temperatures, e.g. of the order of 135° C., for extended periods of time, e.g. of the order of about 100 to about 200 hours, is required. However, a flexible separator in the form of a flexible asbestos matrix having a substantially inorganic flexible film applied thereto according to the above-noted application, may be substantially weakened by such heat treatment or heat sterilization in the presence of alkali, because of the above-noted dissolution tendency of the asbestos matrix or mat under such conditions.

Also, in the case of inorganic matrix materials, such as asbestos and potassium titanate, natural impurities present in the fiber, such as nickel and iron, cause excessive gassing during cell cycling, particularly in cells or batteries which employ zinc anodes. In sealed cells, reduction of gas evolution is a critical problem.

In addition, in a porous flexible matrix such as asbestos mats having a separator composite film, that is, an organically bonded inorganic separator film, applied thereto, according to the above application, particularly employing polyphenylene oxide as the curable organic polymer in such film, there is a tendency for such curable organic polymer or polyphenylene oxide used for bonding the inorganic material of the film, to be extracted from the flexible film into the body of the asbestos matrix material, resulting in production of a relatively nonuniform film on the flexible matrix.

In order to avoid the above-noted problems and to protect the fibers of the porous flexible matrix, e.g. the asbestos fibers, from alkali attack and oxidation by the silver electrode in silver-type cells, and to avoid the above-noted gassing and nonuniform coating problems, we have evaluated a large number of matrix materials initially treated with various materials. These included the impregnation of the porous flexible, e.g. asbestos, matrix initially with various materials, to produce for example rubber-impregnated, silicone-impregnated, acrylic-impregnated, and polyvinyl alcohol-impregnated asbestos matrices. However, none of the flexible asbestos matrix materials initially impregnated with the above-noted materials were found satisfactory for use as battery separators, because the above-noted impregnation treatment either resulted in prohibitively increased resistivity of the matrix, or did not sufficiently increase the resistance of the matrix to chemical and electrochemical degradation, especially at elevated temperatures in the presence of alkali.

We have now found, according to the present invention, that the above-noted problems can be essentially solved, and a flexible matrix having low electrical resistivity and high resistance to alkali attack at elevated temperature over an extended period, and which is highly superior as a matrix for a flexible battery separator can be achieved by initially impregnating a chrysotile asbestos (pure fuel cell grade asbestos) mat with polyphenylene oxide, hereinafter also referred to as "PPO," so that such mat is substantially uniformly impregnated with a minor portion of such polyphenylene oxide, as described more fully hereinafter. To produce this impregnated flexible matrix, a chrysotile asbestos mat, which can be in the form of an envelope of box shaped as noted above, is contacted with polyphenylene oxide, preferably by immersion of the mat in a solvent solution of polyphenylene oxide, removing the solvent from the resulting impregnated mat or envelope, and curing the impregnated polyphenylene oxide.

It has been found that a flexible matrix composed of chrysotile asbestos impregnated with polyphenylene oxide is highly resistant to alkali, e.g. KOH solution, at temperatures of the order of 135° to 150° C., so-called sterilization temperatures, and is substantially unaffected by such high-temperature exposure in the presence of alkali for periods substantially greater than 100 hours, whereas the untreated or nonimpregnated chrysotile asbestos dissolves substantially under the same conditions.

Further, the polyphenylene oxide-impregnated asbestos matrix of the invention has an electrical resistivity which is substantially the same as the initially untreated chrysotile asbestos when moderate amounts of the PPO are impregnated, so that the impregnation of the chrysotile asbestos mat with such polyphenylene oxide according to the invention does not adversely affect the resistivity of the matrix, particularly when employed for producing a flexible separator by further applying a flexible bonded substantially inorganic coating to the previously impregnated matrix, as is described more fully below.

Thus for example, when the initially PPO-impregnated pure asbestos mat or bag-shaped matrix has applied thereto a composite zirconia-based flexible inorganic separator film to produce a flexible battery separator or separator compartment for insertion of an electrode, and such separator employed in a high energy density, e.g. silver-zinc battery, such separator was found to be capable of withstanding heat sterilization for over 100 hours at temperatures of the order of 135° C., and after sterilization had normal performance characteristics and could be charged and discharged over a large number of cycles without degradation and with good electrical performance, whereas employing ordinary flexible asbestos matrix material without initial impregnation with polyphenylene oxide, and applying the same zirconia-based flexible separator coating, could not withstand such heat sterilization and after cycling for a relatively lower number of cycles, failed due to shorting.

Also, by employing the initially PPO-impregnated chrysotile asbestos matrix, and applying thereto the above-noted flexible substantially inorganic film, and such impregnated and coated matrix employed in a high energy density silver-zinc battery, substantially less gassing occurred as compared to the same separator, but which was not initially impregnated with PPO, due to the protective covering or coating of the asbestos fibers within the body of the chrysotile asbestos mat by the impregnated PPO.

In addition, by production of an initially PPO-impregnated asbestos mat, the curable organic polymer, which can also be PPO, which is used in admixture with the inorganic separator material for producing the bonded separator film subsequently applied to the flexible matrix, does not tend to be extracted from the flexible coated film into the body of the asbestos matrix, which often takes place where the asbestos flexible matrix is not initially impregnated with PPO. Hence, according to the present invention, the presence of the PPO impregnated into the initial flexible matrix prevents any of the cured organic polymer, which can also be PPO, in the coated film from passing into the body of the matrix, which would result in a nonuniform film, so that the PPO-impregnated matrix of the invention permits the applied bonded inorganic flexible coating to be highly uniform.

In carrying out the invention, it has been found that to produce battery separators which are heat sterilizable in the presence of alkali over a long period, it is necessary to employ a pure fuel cell grade asbestos, that is, a chrysotile asbestos mat or matrix. The polyphenylene oxide used for treatment or impregnation of such mat can have varying molecular weights. One representative type of commercially available polyphenylene oxide has a molecular weight ranging from about 25,000 to about 30,000, but it will be understood that the molecular weight of the PPO can be outside such molecular weight range. The asbestos mat or matrix is treated with the PPO by immersing the mat in a treating solution generally prepared by dissolving the polyphenylene oxide in a suitable solvent such as chloroform, although other suitable solvents such as trichlorethylene, carbon tetrachloride, or mixtures thereof, can be employed. The concentration of such PPO solvent solution can be varied, and can range from about 0.5 to about 25 percent, but generally solution concentrations of about 2 to about 10 percent are used. The asbestos mat is placed preferably parallel to the surface of the solution. The mat is allowed to lie on the surface until the solution diffuses through the mat and the mat commences to sink. By not totally immersing the mat initially, entrapped air is allowed to escape, thus achieving a uniform saturation treatment. When the mat is substantially saturated with the PPO solution, the saturated asbestos mat is suspended preferably in air and allowed to dry. Final curing of the PPO is accomplished in air at temperature varying from ambient up to about 350° F. Preferably such curing is accomplished at elevated temperature, e.g. ranging from about 100° to about 300° F., e.g. about 150° F. Time curing can range from the order of about 15 minutes, e.g. when the saturated mat is cured at temperature of the order of about 150° F. in an air circulating oven, up to about 24 hours where curing is carried out by drying at ambient temperature. The thus cured or impregnated chrysotile asbestos mat can then be formed into the desired shape, that is in the form of a box, bag or envelope to receive a battery electrode, or the initial chrysotile asbestos mat or matrix can be formed into the desired, e.g. box-shaped form, and then impregnated with PPO essentially in the manner noted above.

Another method for preparing the PPO-impregnated asbestos mat or matrix is to carry out a mat-forming process wherein chopped short asbestos fibers usually of a length not greater than about 0.10 inch, are mixed with the above-noted PPO solvent solution until a uniform mixture is obtained. The resulting mixture can be formed into a mat by digestion onto a fine mesh screen and allowed to dry. The mat is removed from the screen after drying. However, this method is not preferred, and the preferred procedure is that described above starting initially with a chrysotile asbestos mat obtained from commercial sources such as John Manville Corporation.

The invention will be more clearly understood from the further description below of certain embodiments of the invention, taken in connection with the accompanying drawing, wherein:

FIG. 1 is a representation of a box-shaped flexible porous chrysotile asbestos matrix for production of a PPO-impregnated flexible matrix which can then be further treated as described below to form an electrode compartment for a battery, according to the invention;

FIG. 2 illustrates a preferred mode of procedure for impregnating the porous flexible box-shaped matrix of FIG. 1 with PPO for producing the PPO-impregnated matrix of the invention;

FIG. 2a is an enlarged cross section of the body of the asbestos matrix of FIG. 1 impregnated with PPO;

FIG. 2b is an enlarged cross section of the PPO-impregnated mat of FIG. 2a with a bonded inorganic flexible film applied thereto;

FIG. 2c is an enlarged cross section of the asbestos matrix of FIG. 1 having a bonded inorganic flexible film, but which is not initially impregnated with PPO;

FIG. 3 illustrates incorporation of an electrode into the box-shaped PPO-impregnated porous flexible matrix, following application of a flexible substantially inorganic coating thereto, in the condition illustrated in FIG. 2b;

FIG. 4 shows a flexible porous separator having the structure of FIG. 2b, in the form of an electrode compartment according to the invention, containing an electrode, as in FIG. 3, and assembled in a single cell battery together with a conventional electrode;

FIG. 5 illustrates an assembly of a plurality of the electrode-flexible separator units of FIG. 3, to form a multiplate battery; and FIG. 6 illustrates wrapping a flexible porous separator sheet having the structure of the invention illustrated in FIG. 2b, around a plurality of conventional electrodes to provide a multiplate battery assembly.

A box-shaped porous flexible chrysotile asbestos envelope indicated at 10 in FIG. 1 of the drawing, having sidewalls 11, and closed at its bottom 12 and open at its top 14, is immersed in a solvent solution of PPO in chloroform, for example, illustrated at 16 in FIG. 2 of the drawing, as described above. The concentration of the solvent solution is varied as desired, essentially within the concentration range as noted above, and following saturation with the solvent solution 16, the saturated asbestos envelope 10 is withdrawn from the solution, the solvent removed as by drying, and the PPO cured, as described above to impregnate the body, or walls and bottom 12, of the flexible asbestos envelope 10 substantially uniformly with PPO. The concentration of the solvent solution of PPO employed is such that when the envelope 10 is saturated with such solution and the resulting saturated envelope is dried and cured as noted above, the envelope will be saturated envelope is dried and cured as noted above, the envelope will be uniformly impregnated with at least about 0.5 percent, and as high as 25 percent, by weight PPO. However, for high rate battery application the amount of PPO impregnated into the asbestos mat or envelope 10 preferably ranges from about 1 percent by weight, an amount of about 2 to about 6 percent usually producing highly desirable results. Where an amount of PPO greater than about 10 percent is employed, the resulting impregnated matrix is suitable for producing battery separators for use in low rate batteries, since these larger amounts of PPO tend to increase the resistivity of the separator.

The envelope or bag 10, in the form of a box-shaped compartment, can be fabricated by folding, wrapping, heat-sealing or cementing the porous flexible carrier material to form the desired configurations, and such configuration can be formed either prior to or subsequent to impregnation of the chrysotile asbestos carrier or mat with the PPO to form the PPO-impregnated matrix as described above.

In producing a battery separator from the PPO-impregnated chrysotile asbestos mat or envelope 10, such initially PPO-impregnated envelope 10 is treated with a mixture of a major portion of a porous particulate inorganic material, as described more fully below, a minor portion of potassium titanate, such potassium titanate preferably being in the form of short fibers, and a minor portion of a curable organic polymer capable of bonding the particles of the inorganic material and the potassium titanate fibers together upon curing and forming a porous structure, such polymer being dissolved in a suitable solvent, and including removing the solvent and curing the polymer, such curing preferably being carried out at temperatures ranging from about 100° to about 550° F.

Thus, the flexible PPO-impregnated envelope 10 is immersed in a slurry of the inorganic separator material, which is preferably formed of a solvent containing inorganic or ceramic separator material of any suitable type, such as those described hereinafter, and preferably chopped potassium titanate fibers, preferably of a size less than about 0.0008 percent in length, mixed together in major and minor proportions respectively, to form a highly uniform mixture of the inorganic separator material and potassium titanate fibers, with an organic polymeric material incorporated with the inorganic or ceramic powders and having the property of bonding the individual particles of the inorganic material and potassium titanate fibers together upon curing of the organic polymer to result in a porous essentially inorganic film effective when used as a battery separator.

The inorganic separator material present as an essential component of the above-noted slurry and forming an essential component of the flexible separator coating on the PPO-impregnated flexible matrix 10, can include a variety of porous inorganic or ceramic substances in powder or particulate form. Thus, for example, suitable inorganic separator materials include insoluble hydrous metal oxides such as the hydrous oxides of zirconium, titanium, antimony, tungsten, silicon, scandium, bismuth, vanadium, aluminum and cerium in particulate form. A preferred separator of this type is hydrous zirconium oxide or zirconia.

Other porous inorganic materials which can be employed for producing the separator according to the invention include particulate sintered aluminosilicates, especially the alkali metal and alkaline earth metal aluminosilicates and alumina, because of their formation of a hard ceramic material upon sintering, while still retaining suitable porous characteristics. The aluminosilicates of suitable porous internal structure are particularly preferred in this respect. Examples include nonfluxed aluminosilicate, fluxed aluminosilicates or salts thereof, such as sodium and potassium aluminosilicates, and magnesium, calcium, barium and strontium aluminosilicates, e.g., magnesium aluminosilicate (Cordierite). These materials can be used separately, but often mixtures of these particulate aluminosilicates are used, e.g., complex mixtures of both the alkali metal and alkaline earth metal aluminosilicates. Such aluminosilicate separator materials are described in the above U.S. Pat. No. 3,379,570.

Another useful class of inorganic separator materials are the naturally occurring clay minerals of the kaolinite group. This is a group of naturally occurring clays containing aluminum oxide and silica, usually together with bound water, and having the formula $Al_2O_3 \cdot 2SiO_2 \cdot 2H_2O$. In addition to kaolinite, other useful members of this group include the mineral clays halloysite, dickite, nacrite and anauxite.

Other types of inorganic separator materials which can be employed include those in the form of a particulate sintered porous solid solution of magnesium silicate and a member selected from the group consisting of zinc silicate and iron silicate as described and claimed in the copending application Ser. No. 539,554, filed Apr. 1, 1966, of Frank C. Arrance, et al. now U.S. Pat. No. 3,446,668 and which includes the naturally occurring magnesium-iron silicate solid solution known as the mineral Olivine, and the inorganic separator materials in the form of a particulate sintered porous solid solution of an aluminum-bearing material such as aluminum oxide, and a substance selected from the group consisting of chromium, cobalt, nickel, magnesium, calcium and iron-bearing materials, e.g., a mixture of alumina and chromic oxide, as described and claimed in copending application, Ser. No. 555,891, filed June 7, 1966, of Frank C. Arrance, et al. now U.S. Pat. No. 3,446,669.

Still another form of inorganic separator material which can be employed according to the invention are porous sintered separators consisting essentially of a solid solution of a major portion of magnesium oxide and a minor proportion of an oxide such as zirconium dioxide, chromic oxide, aluminum oxide, titanium oxide, and certain other oxides, as described in copending application Ser. No. 727,394, filed May 8, 1968 of F. C. Arrance, et al. now U.S. Pat. No. 3,575,727.

Also inorganic separator materials derived from natural chromite, termed ferrochromite, and containing oxides of iron, magnesium, aluminum and chromium and formed into a sintered solid solution, as described and claimed in copending application Ser. No. 727,678 of F. C. Arrance, filed May 8, 1968, now U.S. Pat. No. 3,539,394 can be employed.

As further examples of inorganic separator materials which can be employed are sintered zirconia separators, e.g., calcia stabilized zirconia, sintered alumina and sintered thoria.

An exemplary form of calcia stabilized zirconia is produced by heating a mixture of 96 percent zirconia ($ZrO_2$), and 4 percent calcium oxide to temperature of the order of about 3,000° F., to form a solid solution of calcium oxide and zirconium oxide, forming a mixture containing 97 percent of the resulting calcia stabilized zirconia and 3 percent bentonite, presintering such material at 1,000 to about 1,200° C., ball milling such sintered material to small particle size, compacting such material into separator membranes at pressures ranging, e.g., from about 2,000 to about 10,000 p.s.i., and sintering again to temperature of about 1,000° to about 1,200° C., to produce zirconia separator membranes or separator material.

An exemplary form of alumina separator material is formed by compacting alumina (aluminum oxides), e.g., at pressures of about 5,000 to 10,000 p.s.i., into membranes, and sintering such membranes at temperatures ranging from about 300°, to about 1,800° C.

As a further example, inorganic separator materials formed from chrome-iron and known as spinelloids and formed of $FeO-CrO_3$ and comprising, e.g. 35 to 50 percent chromic oxides, together with some silica as magnesium silicates, can also be employed.

Additional inorganic materials in particulate form which can be employed include silicates such as magnesium silicate (Fosterite), and the like.

Preferred inorganic separator materials are those selected from the group consisting of (a) a solid solution of magnesium silicate and iron silicate, (b) zirconia, (c) a solid solution of a major portion of magnesium oxide and a minor portion of an oxide selected from the group consisting of chromic oxide, zirconium dioxide, titanium dioxide and alumina (d) a solid solution of ferrochromite, (e) spinelloids and (f) alumina.

The term "inorganic separator materials" or "sintered ceramic separator material," as employed herein, is intended to denote any of the above-noted sintered inorganic separator materials.

When employed for producing the porous, flexible film applied to the PPO-impregnated chrysotile asbestos matrix described above, the inorganic separator material is in power and particulate form.

It will also be understood that mixtures of the above inorganic materials can be employed in producing the flexible, porous separator film.

The organic polymeric materials incorporated with the inorganic or ceramic materials or powders noted above to produce the flexible separator film on the PPO-impregnated chrysolite asbestos matrix of the invention are preferably chosen from those curable polymers which have the property of bonding the individual particles of inorganic materials and the potassium titanate fibers together upon curing of the organic polymer, but do not fill the voids between the ceramic material and potassium titanate particles, so as to result in a porous structure effective when used as a battery separator. A preferred polymeric material which has been found particularly advantageous is the above-noted polyphenylene oxide also employed for initially impregnating the chrysotile asbestos matrix. Polysulfone can also be employed in admixture with the inorganic materials but results in a less porous flexible separator film of higher resistivity than when employing polyphenylene oxide. Also, polyamides such as nylon, neoprene rubber, polyepoxides, such as the polymer of bisphenol A and epichlorhydrin (the Epons), and fluorocarbon polymers such as vinylidene fluoride polymers (Kynar), and the copolymer of hexafluoropropylene and vinylidene fluoride (Viton) may be employed. In addition to having the properties of bonding the particles of inorganic material and potassium titanate together so as to form a flexible, strong, this membrane having suitable porosity for use as a battery separator, such polymers should be resistant to attack by chemicals such as alkaline solutions, e.g., potassium hydroxide solution, employed in high energy density batteries, both at ambient and at elevated temperatures.

The above-noted organic polymeric materials are employed in particulate or granular form, and mixtures of such polymeric materials also can be employed.

The relative proportions of inorganic or ceramic material, potassium titanate particles and organic polymeric binder employed for producing the flexible film on the PPO-impregnated flexible matrix of the invention can vary. The amount of ceramic powder and potassium titanate together preferably should be at least 50 percent, and preferably substantially greater than 50 percent, of the mixture, and the amount of either the ceramic material or the potassium titanate employed can be less than or in excess of 50 percent of the mixture; ordinarily, the inorganic or ceramic material is present in major proportion and the potassium titanate in minor proportion. In preferred practice, the organic polymeric material is employed in minor proportions to obtain sufficient bonding and porosity, yet to afford substantial flexibility. Thus, for example, generally there can be employed from about 50 percent to about 95 percent of inorganic or ceramic powder, about 2 percent to about 35 percent potassium titanate fibers, and about 2 to about 48 percent, by weight, of organic polymeric material. The proportion of polymeric material employed in combination with the mixture of ceramic material and potassium titanate is chosen to provide a separator film of good flexibility and film strength on the PPO-impregnated flexible matrix, yet which has low resistivity and other characteristics permitting the membrane to function efficiently as a battery separator, especially in high energy density alkaline batteries.

The organic polymer is dissolved in a volatile solvent which dissolves the polymer and which has good volatility to permit quick removal from the coated film. Any suitable solvent having these characteristics can be employed. The particular solvent chosen depends in large measure on the particular polymer employed. Thus, for example, as previously indicated, chloroform, trichloroethylene, toluene, mixtures of chloroform and carbon tetrachloride, and mixtures of chloroform and trichloroethylene have been found suitable for use with polyphenylene oxide polymer. Dimethyl acetamide has been found suitable for use with polysulfone and fluorocarbon polymers, and toluene has been found suitable for employment with neoprene rubber and epoxy material. The amount of solvent employed can vary, but generally the amount employed is such that the organic or polymeric solids content ranges from about 20 to above 70 parts per 100 parts by weight of solvent, the amount of solvent used being such that it is readily evaporated in a conveniently short time after film formation.

It has also been found advantageous to incorporate with a curable organic polymer employed in producing the flexible porous film, a minor portion of an organic component selected from the group consisting of monomeric and polymeric azelate, pelargonate and oleate esters. These materials are incorporated in the above-noted solvent with the curable, organic polymer, employing a common solvent, e.g., chloroform, for both the curable organic polymer and the above-noted organic component. Such monomeric or polymeric esters aid in producing a highly flexible film which is very thin, e.g. of the order of 0.001 inch, yet which is rugged and durable, and in reducing the resistivity of such film.

Typical examples of monomeric azelates, pelargonates and oleates, which can be employed, are di-2-ethylhexl azelate, di-isooctyl azelate, and di-n-hexyl azelate; diethylene glycol dipelargonate, triethylene glycol dipelargonate, butanediol dipelargonate and 2-butoxyethyl polargonate; tetra hydrofurfuryl oleate and diethylene glycol monooleate. Examples of preferred polymers are polypropylene and polyethylene polyazelates, particularly the former. These polymers or polyazelates generally have an average molecular weight range from about 850 to about 6,000, and are particularly preferred for production of improved flexible separators of the invention. Such polymers can, but do not necessarily, contain additives incorporated therein, e.g., to control molecular weight by functioning to retard or prevent further polymerization of such polymers. These additives can include phthalates such as dioctyl phthalate, alkanoates and alkanes, having, e.g., from eight to 16 carbon atoms, such as decanoic acid, and the like. The term "polypropylene polyazelate phthalate alkanate" as employed herein is intended to denote polypropylene polyazelate polymer containing phthalate and alkanoate or alkane additives as above defined. Polymers containing such additives generally have a lower molecular weight as compared to the same polymer in the absence of such additives.

The above examples of monomeric and polymeric esters can range from very fluid to very viscous materials. Combinations of these esters can also be employed, such as a combination of polymeric azelate and a monomeric pelargonate.

The above-noted monomeric and polymeric azelates, polargonates and oleates are marketed as "Plastolein" by Emery Industries, Inc., of Cincinnati, Ohio.

When employing such esters in combination with the curable organic polymer for producing the flexible film, the total amount of such organic components employed is within the above-noted range of about 2 percent to about 48 percent by weight of total inorganic and organic solids. The proportion of the above monomeric or polymeric ester present in the mixture thereof with the curable organic polymer, e.g., polyphenylene oxide, can very, but usually ranges from about 5 percent to about 50 percent by weight of such mixture.

The slurry of inorganic or ceramic powder, e.g. sintered zirconia powder or solid solution of magnesium silicate and iron silicate, and potassium titanate particles, and the curable organic polymer, e.g., polyphenylene oxide, and also including the above-noted monomeric or polymeric ester, e.g., azelate, when employed, dissolved in the solvent, is preferably maintained in vibration when the PPO-impregnated chrysolite asbestos matrix is dipped or immersed in the slurry. The vibration of such mixture results in obtaining a uniform coating of the mixture on such PPO-impregnated matrix.

If desired, such slurry can be sprayed, brushed, or otherwise applied to the PPO-impregnated asbestos matrix. If spraying is employed, the amount of solvent employed in the slurry is increased to facilitate such spraying.

After the above-noted slurry or mixture is applied as a coating to the PPO-impregnated flexible asbestos matrix, such matrix containing such coating is subjecting to air drying for solvent removal. The coating is then cured at temperatures which can range from about 100° to about 550° F., with the time of curing depending upon the particular polymer employed, the size of the particular surface area being covered, and other factors, including the temperature of cure. Curing time can range, for example, from about 10 to about 30 minutes, at the above elevated temperatures. Although air drying of the coated film for an extended period of time, e.g., of the order of about 24 hours or more, can eliminate curing at elevated temperatures, this is not preferred practice.

The thickness of the coating or film of bonded inorganic separator material formed on the initially PPO-impregnated chrysotile asbestos mat, or envelope 10, can range from a coating thickness on each side of the envelope of between about 0.001 inch and about 0.015 inch, usually between about 0.003 inch and about 0.006 percent, noting that such film or coating is formed both on the outside and inside surfaces of the open ended envelope 10, immersed in the slurry as noted above. The thickness of the initial flexible chrysotile asbestos matrix employed can range from about 0.003 inch to about 0.050 inch.

The porosity of the flexible separators of the invention, e.g., in the form of a flexible chrysotile asbestos envelope or matrix, following initial PPO-impregnation and subsequent application of the flexible inorganic separator film, can range from about 5 to about 35 percent, but such range is understood to be only exemplary.

Pore sizes or diameters of the final flexible porous chrysolite asbestos mat or envelope initially impregnated with PPO followed by application of the flexible inorganic separator film, generally can range from about 1 to about 400, preferably about 5 to about 200, Angstrom units, but can be outside this range.

FIGS. 2a and 2b of the drawing illustrate schematically in enlarged cross-sectional views of a portion of the wall 11 of the flexible asbestos envelope 10, the condition of the flexible matrix following initial impregnation with PPO, and then following formation of the flexible bonded inorganic coating thereon. Referring to FIG. 2a following impregnation of the chrysotile asbestos envelope 10 with PPO, it is seen that the flexible wall 11 of the envelope has substantially uniformly distributed therein throughout its thickness, the particles of cured PPO. Following treatment with the mixture of inorganic separator material and curing of the polymer bonding the inorganic material together, there is formed on opposite surfaces of the flexible wall 11 of the envelope the flexible film 15, the inorganic material of which is bonded together by particles of the cured organic polymer, e.g. PPO, as indicated at 17. It is thus seen in FIG. 2b that the chrysotile asbestos mat or envelope is uniformly impregnated with PPO, and because of such impregnation, the cured polymer such as PPO employed in producing the flexible substantially inorganic film 15 remains substantially in the outer films and there is substantially no tendency of the organic polymer or PPO in the outer film to be extracted therefrom into the interior of the wall or body of the flexible asbestos matrix, thus maintaining a uniform flexible separator film 15 on opposite surfaces of the flexible matrix.

On the other hand, as seen in FIG. 2c, illustrating the flexible separator structure of the above copending application, Ser. No. 707,808, in the absence of initial PPO-impregnation of the asbestos wall 11, the organic polymer, e.g. PPO, illustrated at 17' and employed for bonding the inorganic material in the outer film 15', a portion of which film impregnates only to a minor extent into the surface of the asbestos matrix as indicated at 15", tends to be extracted or to migrate into the interior or body of the porous wall 11 as indicated by the arrows, thus removing bonding polymer from the outer film 15' and resulting in a nonuniform outer film.

As previously noted, the porous flexible bag or electrode compartment following initial PPO impregnation and application of a flexible inorganic film to the surface thereof according to the invention, as illustrated at 10' in FIG. 2b, is highly flexible and can be bent in any direction, but it is of considerable strength and is resistant to tearing and can be handled readily without damage. It is also noteworthy that it was unexpected to find that even with impregnation of PPO substantially throughout the thickness of the matrix, as indicated in FIG. 2b, the resulting separator still retains substantial porosity and has a resistivity, when employing as much as about 8 percent PPO initially impregnated in the matrix, which is essentially as low as the resistivity of the same asbestos matrix in the absence of the preimpregnated PPO.

As illustrated in FIG. 3, an electrode 18, preferably containing a collector grid indicated at 19, can be inserted into the envelope or box-shaped flexible electrode compartment 10' of FIG. 2b of the invention, without damage to the bonded inorganic separator film 15, as a result of expansion of the sides of the envelope during the process of incorporating the electrode.

Instead of initially impregnating with PPO and then coating the flexible porous envelope with a flexible film, followed by inserting an electrode therein, as illustrated in FIG. 3, if desired, an electrode e.g. a zinc electrode, can be first inserted into the flexible chrysotile asbestos envelope 10, as illustrated in FIG. 1, and the envelope containing the electrode can then be impregnated with PPO in the manner described above, followed by treating the thus impregnated flexible envelope with the inorganic separator material to provide in addition the flexible essentially inorganic separator film on the flexible carrier as previously described, with the electrode contained therein.

Any type of electrodes can be inserted into and insulated by the flexible separator compartment 10', produced according to the invention. These include the lead electrodes employed in conventional lead-acid batteries, and particularly electrodes employed in high energy density batteries such as silver, zinc, cadmium and nickel electrodes. The invention provides an improved battery separator particularly suitable for use in high energy density batteries such as silver-zinc, silver-cadmium, nickel-cadmium, nickel-zinc and metal-air batteries, using aqueous electrolytes, and for other battery systems such as those employing nonaqueous electrolytes such as propylene carbonate, butyrlactone, with such electrode couples as lithium-cupric chloride and magnesium-silver chloride.

During discharge of batteries such as those described and illustrated above, as is well known, e.g., in the case of a silver-zinc battery, the zinc converts to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium," and the term "lead" referring to the metals forming the respective electrodes of silver-zinc, silver-cadmium, nickel-cadmium and lead-acid battery systems are intended to denote either the respective metals themselves or the corresponding oxides thereof.

The zinc electrode-separator unit, as indicated at 20 in FIG. 3 of the drawing, including the flexible separator bag 10' containing the zinc electrode 18, can be incorporated in a battery 22 as illustrated in FIG. 4, together with a conventional silver electrode 24, the unit 20 being disposed substantially in contact with the silver electrode 24, with an adjacent portion of the flexible film of the separator envelope 10' being in contact with the adjacent surface of the silver electrode. If desired, although not necessary, a material such as Teflon felt, indicated at 25, can be placed over the top of the zinc electrode 18 within the flexible separator envelope 10', to aid in retaining the electrolyte in the zinc electrode compartment. The collector grid 19 of the zinc electrode is connected by a lead 26 to an external terminal 28, and the collector grid 30 of the silver electrode is connected by means of a lead 32 to a terminal 34.

There is illustrated in FIG. 5 the incorporation of the electrode-separator unit produced according to the invention and illustrated at 20 in FIG. 3, in the form of a flexible separator envelope 10' containing zinc electrode 18, in a multiplate battery 36. In this arrangement, it is seen that three zinc-separator units 20 including zinc electrodes 18, according to the invention, are alternately disposed in relation to four silver electrodes 24, with the flexible film 10' of the respective envelope or electrode compartment units 20 separating adjacent zinc and silver electrodes 18 and 24, respectively. The leads 26 from the zinc electrodes 18 are collectively connected to the terminal 28, and the leads 32 from the silver electrodes 24 are collectively connected to the terminal 34. It is seen that the separator-electrode units 20, with the flexible envelope 10', permit simple placement of these units in the battery with the respective silver electrodes 24 disposed alternatively therebetween, and insulating the respective silver and zinc electrode compartments, without the necessity for separate individual separators being incorporated in the battery with means for supporting such separators so as to insulate the electrode compartments.

Instead of employing an envelope or box-shaped flexible electrode compartment, as illustrated at 10 and 10' in the drawing, the separator of the invention can be prepared commencing with a flexible chrysotile asbestos matrix or sheet, and after processing as described above, i.e., by initially impregnating the flexible matrix with PPO followed by treatment with a slurry of a substantially inorganic material, the resulting impregnated and coated flexible chrysotile asbestos separator can then be formed into the desired shape, e.g., a boxlike configuration such as illustrated at 10', for receiving an electrode.

Alternatively, the above-noted flexible porous matrix or sheet, impregnated with PPO and coated with a film of essentially inorganic separator material according to the invention, can be wrapped around one or a plurality of electrodes to provide a battery assembly.

Thus, in FIG. 6 there is illustrated a multiplate battery indicated at 40 formed of a plurality of three zinc electrodes 18 and four silver electrodes 24, alternately arranged in a battery pack. A porous flexible separator film or sheet, indicated at 42, formed according to the invention by impregnating a porous flexible chrysotile asbestos matrix with a slurry of an essentially inorganic separator material containing polymeric bonding agent as described above, is wrapped in serpentine fashion around each of the zinc and silver electrodes 18 and 24, respectively, to provide a separator film between each adjacent pair of zinc and silver electrodes.

It will be understood that in the embodiment of FIGS. 4 and 5, the conventional silver electrodes 24 can also be in the form of an electrode-separator unit, as illustrated at 20 in FIG. 3, according to the invention, in the form of a flexible porous separator envelope 10' containing the electrode and produced by procedure as described above.

The following are examples of practice of the invention.

EXAMPLE 1

A chrysotile asbestos matrix in the form of a mat is immersed in a 13 percent PPO chloroform solution, and maintained therein until saturated with the solution. The mat is withdrawn from the solution and suspended in air and dried. The treated mat is then cured at 150° F. for 15 minutes in an air circulating oven, and the resulting chrysotile asbestos mat is substantially uniformly impregnated with PPO so that the impregnated matrix is composed of 85 percent chrysotile asbestos and 15 percent PPO.

This matrix has an electrical resistivity of 5.7 ohm-cm., substantially the same as for the same chrysotile asbestos mat, but without PPO impregnation.

The above impregnated asbestos matrix is sterilized by heating for 108 hours at 145° C. in the presence of 30 percent KOH, and is found to be unaffected by such treatment, whereas an unimpregnated chrysolite asbestos mat treated under the same conditions noted above essentially dissolves.

EXAMPLE 2

A zirconium oxide powder is ground to a particle size such that 95 percent of the powder is composed of particles of less than 10 microns size.

Potassium titanate fibers are chopped up into very short lengths, sufficiently short so that the chopped fibers pass through a 0.008 inch screen.

A mixture of about 18 parts of zirconium oxide powder and about 1 part of the chopped potassium titanate fibers, by weight, is passed through a mill.

The resulting mixture of ceramic powder and potassium titanate fibers is then combined with 1 part by weight of polyphenylene oxide dissolved in chloroform, thus forming a slurry consisting of about 90 percent of the zirconium oxide powder, about 5 percent of potassium titanate particles, and about 5 percent polyphenylene oxide, by weight.

The flexible PPO-impregnated chrysotile asbestos matrix of example 1 is formed into a box-shaped configuration, as illustrated in FIG. 1 of the drawing, is dipped into the above slurry while maintaining the slurry under vibration by means of an AC solenoid, and stirred, to facilitate uniform saturation and coating of the flexible asbestos envelope and escape of air. After dipping, the asbestos coated and impregnated envelope is air-dried for 15 minutes to remove solvent, and is then oven-cured for 15 minutes at 350° F.

The resulting impregnated and coated asbestos envelope is highly flexible, has a porosity of about 30 percent, and pore size ranging from about 5 to about 200 Angstroms. The thickness of the initial pure asbestos envelope is 0.010 inch, and the overall thickness of the coated film, that is the sum of the coating thickness on the opposite surfaces, is about 0.006 inch.

The resulting impregnated and coated flexible asbestos envelope forms an electrode compartment, and a standard zinc electrode is inserted therein to form a flexible separator-electrode unit, as indicated at FIG. 3 in the drawing.

The resulting separator-zinc electrode unit as indicated in FIG. 3 is incorporated in a battery of the type illustrated in FIG. 4 employing one silver electrode. A 30 percent potassium hydroxide solution is employed as electrolyte in the battery.

The resulting battery is subjected to heat sterilization for 120 hours at 135° C. After sterilization the battery has normal performance characteristics and is charged and discharged 13 times without degradation of performance or loss of separator integrity, as evidenced by the OCV (open circuit voltage) which is 1.86 after a 24 hour cycling test.

EXAMPLE 3

The procedure of example 1 is substantially followed for impregnating a chrysotile asbestos matrix in the form of an envelope as illustrated at 10 in FIG. 1, but employing a chloroform solution of polyphenylene oxide having a concentration of about 2 percent. The resulting PPO-impregnated chrysotile asbestos envelope is impregnated with 2 percent PPO, that is, such matrix is composed of 98 percent asbestos and 2 percent PPO.

The resulting PPO-impregnated chrysotile asbestos envelope is dipped into a slurry under vibration and stirring, such slurry consisting of a solids mixture in chloroform consisting of 76 percent of zirconium oxide powder, 4 percent of potassium titanate fibers chopped into short lengths of the order of about 0.008 inch, or less, 10 percent polyphenylene oxide and 10 percent polypropylene polyazelate, marketed as Plastolein P-9750, and having an average molecular weight of about 2,200. The polyphenylene oxide and polypropylene polyazelate are dissolved in the chloroform. The solids concentration of the slurry is about 60 percent.

The resulting PPO-impregnated flexible envelope with a coating of flexible film-forming material thereon is removed from the slurry, is air-dried for 15 minutes to remove solvent, and the coating is then oven-cured for 15 minutes at 350° F.

The resulting flexible chrysotile asbestos separator impregnated with PPO and coated with a flexible substantially inorganic film, has a porosity of 35 percent, an overall coating thickness of about 0.006 inch, and has good strength.

A zinc electrode is inserted into the above flexible separator envelope, as illustrated in FIG. 3 of the drawing and two of such flexible separator-zinc electrode units are placed in a battery together with one silver electrode disposed therebetween, to form a 1.5 AH (ampere hour) battery, and the resulting battery containing a 30% KOH solution subjected to heat sterilization at about 135° C. for 180 hours without any material degradation of the separator.

The battery is subjected to a discharge-charge regime, each discharge being at 1.0 amps. (current density of 30 ma./cm.$^2$) to 1.0 volt (100 percent depth of discharge), and a charge cycle of 18 hours at 4 ma./cm.$^2$ at 1.210 volts. The battery operates for a total of 114 of such discharge-charge cycles without degradation of performance of loss of separator integrity, demonstrating that the battery is capable of long stand life and cycle life.

Also, during such discharge-charge cycling little, if any, gassing occurs from the separator, due to the protective coating of the impregnated PPO in the chrysotile asbestos matrix, in combination with the bonded flexible inorganic coating on the surfaces of the matrix.

EXAMPLE 4

The procedure of example 3 above is repeated, obtaining the same results, except that in the present case the cycling regime of the battery is a 1 hour discharge at 0.5 amps. (current density of 15 ma./cm.$^2$), and a 3 hour charge cycle at 0.22 amps. (7 ma./cm.$^2$ current density) to 2.10 volts. The battery operates successfully on this cycling regime for 760 cycles without any material degradation of the separator and essentially without any battery gassing.

The procedure of example 3 is followed in each of examples 5 to 13 of the table below, which gives in column A of the table the formula for the mixture of inorganic separator material used in producing the inorganic flexible film on the PPO-impregnated fuel cell asbestos (chrysotile asbestos) matrix in the form of an envelope; in column B is given the percent impregnation of the PPO into the fuel cell asbestos matrix, in column C there is set forth the total number of cycles for the respective cycling regimes set forth in column D. The inorganic materials set forth by formula in column A of examples 5, 6 and 11 to 13 of the table is an Olivine-type separator material in the form of a solid solution of magnesium silicate and iron silicate prepared by sintering at 1,200° C. a natural Olivine consisting essentially of 41.4% $SiO_2$, 49.3% MgO and 7.7% iron oxide (FeO and $Fe_2O_3$) by weight, the remainder consisting essentially of trace amounts of CaO, $Al_2O_3$ and $Cr_2O_3$. The zirconium oxide-iron oxide separator material in column A of example 8 contains 95% zirconium oxide and 5% iron oxide; the zirconium oxide-chromic oxide separator material of example 9 contains 95% zirconium oxide and 5% chromic oxide; and the zirconium ozide-calcium oxide separator material of example 10 contains 95% zirconium oxide and 5% calcium oxide.

The expression "KT" in column A of the table represents potassium titanate fibers of the type employed in example 3; the expression "PPO" represents polyphenylene oxide; and the expression "P-9750" represents the same polypropylene polyazelate component employed in example 3 above.

In example 5 seven of the zinc-flexible envelope separators according to the invention are employed with eight silver electrodes to form an 8 A.H. (amp. hour) battery; in example 6 four of such flexible PPO-impregnated asbestos matrix with flexible inorganic film separator units, together with five silver electrodes are employed in a multiplate 5 A.H. battery; and in example 7 to 13, one zinc electrode-PPO impregnated and inorganic coated flexible asbestos matrix unit and two silver electrodes are employed in a single plate 2 A.H. battery.

It will be noted from examples 5 to 13 of the table above that the employment of the PPO-impregnated chrysotile asbestos matrix containing a flexible inorganic bonding film thereon, functions in various types of single plate and multiplate zinc-silver batteries over large numbers of charge-discharge cycles with good electrical performance and without degradation of the flexible separator, illustrating long cycle life, and minimum gassing tendencies of these batteries are observed.

TABLE

| Example No. | A Inorganic separator material | Percent | B Matrix and percent PPO | C Cycles | D Cycling regime |
|---|---|---|---|---|---|
| 5 | MgO·FeO·SiO$_2$ / KT / PPO / P-9750 | 76 / 4 / 10 / 10 | 2% PPO fuel cell, asbestos. | 61 | Discharge at 5 a. (15 ma./cm.$^2$) to 1.0 v., 100% depth of discharge; 18 hrs. charge at 600 ma. (2 ma./cm.$^2$) to 2.10 v. |
| 6 | MgO·FeO·SiO$_2$ / KT / PPO / P-9750 | 76 / 4 / 10 / 10 | 1% PPO, fuel cell, asbestos. | 105 | Discharge at 2 a. (10 ma./cm.$^2$) to 1.0 v., 100% depth of discharge; 18 hrs. charge at 400 ma. (2 ma./cm.$^2$). |
| 7 | MgO·FeO·Cr$_2$O$_3$ / KT / PPO / P-9750 | 76 / 4 / 10 / 10 | 2% PPO fuel cell, asbestos. | 88 | Discharge at 1.0 a. (30 ma./cm.$^2$) to 1.0 v., 100% depth of discharge; charge 18 hrs. at 110 ma. (3 ma./cm.$^2$) to 2.10 v. |
| 8 | ZrO$_2$·FeO / KT / PPO / P-9750 | 76 / 4 / 10 / 10 | 2% PPO fuel cell. | 52 | Discharge at 1.0 a. (30 ma./cm.$^2$) to 1.0 v., (100% depth of discharge); charge 18 hrs. at 3 ma./cm.$^2$ to 2.10 v. |
| 9 | ZrO$_2$·Cr$_2$O$_3$ / KT / PPO / P-9750 | 76 / 4 / 10 / 10 | 2% PPO, fuel cell, asbestos. | 76 | As above in Example 7. |
| 10 | ZrO$_2$·CaO / KT / PPO / P-9750 | 76 / 4 / 10 / 10 | 2% PPO, fuel cell, asbestos. | 75 | As above in Example 7. |
| 11 | MgO·FeO·SiO$_2$ / KT / PPO / P-9750 | 76 / 4 / 10 / 10 | 4% PPO, fuel cell, asbestos. | 65 | 2 hrs. discharge at 0.5 a. (15 ma./cm.$^2$); 4 hrs. charge at 0.3 a. (10 ma./cm.$^2$). |
| 12 | MgO·FeO·SiO$_2$ / KT / PPO / P-9750 | 76 / 4 / 10 / 10 | 8% PPO, fuel cell, asbestos. | 44 | Same as in Example 11. |
| 13 | MgO·FeO·SiO$_2$ / KT / PPO / P-9750 | 76 / 4 / 10 / 10 | 15% PPO, fuel cell, asbestos. | 107 | ½ hr. discharge at 0.5 a. (15 ma./cm.$^2$); 1 hr. charge at 275 ma. (9 ma./cm.$^2$). |

EXAMPLE 14

The procedure of example 3 is repeated except that in place of the zinc electrodes, cadmium electrodes are incorporated in the flexible separator envelope to form a silver-cadmium battery. Results similar to those of example 3 are obtained.

EXAMPLE 15

The procedure of example 3 for producing the flexible PPO-impregnated and coated chrysotile asbestos separator is followed and such separator is employed in a zinc-oxygen battery employing a platinum catalyst electrode as the oxygen electrode.

This battery operates for about 75 total discharge cycles to 100 percent depth of discharge at 1.0 ampere to 1.0 volt.

From the foregoing, it is seen that the invention provides an improved flexible PPO-impregnated chrysotile asbestos matrix having low resistivity and high resistance to alkali attack, and upon application of a bonded flexible inorganic separator film thereon the resulting PPO-impregnated and coated chrysotile asbestos matrix serves as an improved separator for a high energy density battery, and can be formed into an electrode compartment for insertion therein of an electrode, the resulting separator when incorporated in a battery, particularly a high energy density battery, permitting the battery to be heat sterilized over an extended period in the presence of alkali, and substantially reducing battery gassing during battery cycling.

While we have described particular embodiments of our invention for purposes of illustration within the spirit of the invention, it will be understood that the invention is not to be taken as limited except by the scope of the appended claims.

We claim:

1. A flexible matrix having low electrical resistivity and high resistance to alkali attack at elevated temperature over an extended period, and suitable as a matrix for a flexible battery separator, which comprises a chrysotile asbestos mat substantially uniformly impregnated with polyphenylene oxide in an amount of about 0.5 to about 25 percent by weight of said polyphenylene oxide.

2. A flexible matrix as defined in claim 1, the amount of said polyphenylene oxide ranging from about 1 to about 10 percent by weight.

3. A flexible matrix as defined in claim 1, said flexible chrysotile asbestos matrix being formed into a box-shaped flexible matrix for receiving a battery electrode therein.

4. A flexible porous battery separator having low electrical resistivity, high resistance to alkali attack at elevated temperature over an extended period, extended life and reduced tendency toward producing gassing when employed in a battery, which comprises a flexible matrix as defined in claim 1, said matrix containing a film comprising an inorganic separator material and a cured organic polymer bonding the particles of said inorganic material together, and forming a porous substantially inorganic separator film on said matrix.

5. A flexible porous separator as defined in claim 4, wherein said film consists essentially of a major portion of an inorganic material, a minor portion of potassium titanate fibers, and a minor portion of a cured organic polymer bonding the particles of said inorganic material and said potassium titanate fibers together.

6. A flexible porous separator as defined in claim 5, said organic polymer of said film being polyphenylene oxide, and wherein said flexible porous separator is box-shaped for receiving a battery electrode.

7. A flexible porous battery separator as defined in claim 5, wherein said organic polymer of said film is polyphenylene oxide, and said inorganic material of said film is selected from the group consisting of (a) a solid solution of magnesium silicate and iron silicate, (b) zirconia, (c) a solid solution of a major portion of magnesium oxide and a minor portion of an oxide selected from the group consisting of chromic oxide, zirconium dioxide, titanium dioxide and alumina, (d) a solid solution of ferrochromite, (e) spinelloids and (f) alumina.

8. A flexible porous battery separator as defined in claim 7, wherein said separator is box shaped for receiving a battery electrode.

9. A battery comprising a pair of electrodes of opposite polarity and positioned between said electrodes for retaining electrolyte, a flexible porous separator as defined in claim 4.

10. A battery comprising a pair of electrodes of opposite polarity and positioned between said electrodes for retaining electrolyte, a flexible porous separator as defined in claim 8, said box-shaped separator containing one of said electrodes.

11. A battery as defined in claim 10, including a plurality of said box-shaped separator-electrode containing units, and a plurality of second electrode members arranged in side-by-side relation, with said separator-electrode containing units in alternating arrangement with said electrode members.

12. A battery as defined in claim 11, wherein said inorganic material of said film of said flexible matrix is zirconia.

* * * * *